Jan. 29, 1929.
J. SCHRAMM
ANTISKID DEVICE
1,700,272
Filed Nov. 30, 1927
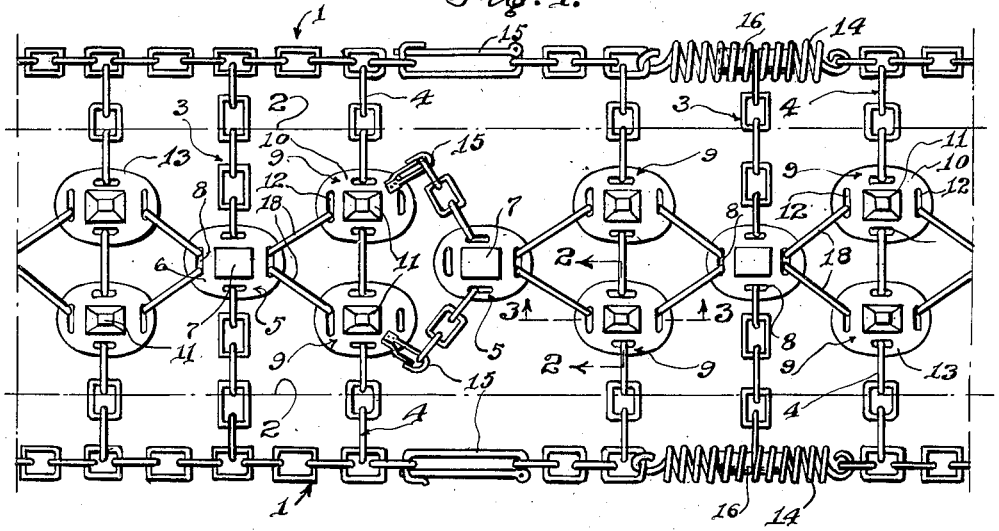
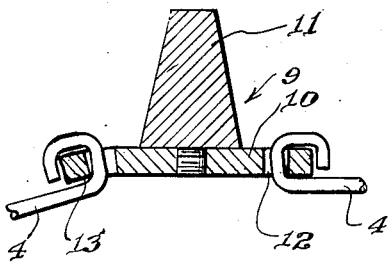
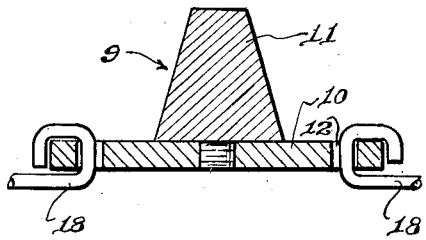
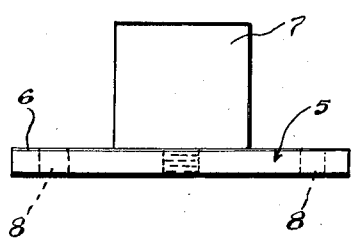
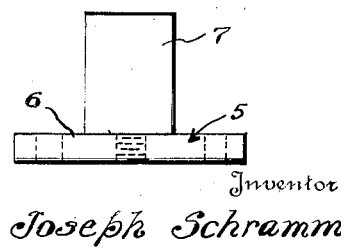
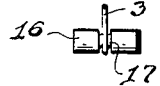
Inventor
Joseph Schramm
By
J. Kaplan
Attorney Patented Jan. 29, 1929.

1,700,272

UNITED STATES PATENT OFFICE.

JOSEPH SCHRAMM, OF McKEES ROCKS, PENNSYLVANIA

ANTISKID DEVICE.

Application filed November 30, 1927. Serial No. 236,693.

This invention relates to an anti-skid device and more particularly to the class of anti-skid chain constructions for use upon wheel tires of automobile and other vehicles.

The primary object of the invention is the provision of a device of this character whereein the same when applied to a tire of the wheel of an automobile or other vehicle will assure positive traction and prevent skidding upon slippery surfaces, the device in its construction embodying tread plates each having a removable calk so that when the latter becomes too worn or damaged for further use a new calk can be substituted.

Another object of the invention is to anchor the tread plates in such manner that each has a free and independent action irrespective of the others and of the tire to which they are applied.

Another object of the invention is the provision of a main tread for causing positive traction and intermediate treads to prevent side slipping. A still further object of the invention is the provision of an anti-skid device of this character which is extremely simple in construction, thoroughly reliable and efficient in its purpose, strong, durable and inexpensive to manufacture.

Other objects will appear in the following description:

In the drawings,

Fig. 1 is a fragmentary plan view showing the anti-skid device constructed in accordance with my invention applied to the tire of a wheel.

Fig. 2 is a vertical section on line 2—2 of Fig. 1 or through one of the tread plates.

Fig. 3 is a section on line 3—3 of Fig. 1.

Figs. 4 and 5 are front and side views of one of the main treads

Fig. 6 is a detail.

Referring to the drawings, numeral 1 designates a set of parallel chains adapted to fit against the side walls of the tire 2, and 3 and 4 a set of main and intermediate cross chains attached at the ends to the parallel chains 1.

The main cross chains 3 include a road engaging element 5 consisting of a plate 6 to which is attached a calk 7. Slots 8 are provided in the plate 6 for the purpose of fastening the various chain links thereto.

The intermediate cross chains 4 include a double set of road engaging elements 9 consisting of a plate 10 and are provided with a tapered calk 11. Slots 12 are formed in the plate for fastening the chain links thereto. As noted in Fig. 2 the outward edge 13 of the plates 10 are bent so as to follow the contour of the tire and therefore not cause any unnecessary wear of same.

Incorporated in the side chains are a set of tension springs 14 for the purpose of resiliently holding the structure on the tire. For applying or detaching the device to and from the tire a set of snap fasteners 15 are provided.

Novel means are provided for attaching the cross chain 3 to the springs 14. Said means consists of pins 16 which fit into the interior of the springs. Formed in the pins are necks 17 to which are attached the ends of the chain links. It will be seen in Fig. 1 that any tendency to lateral displacement of the pins 16 will be prevented as the links which bind the neck 17 of the pins are placed between the coils of the spring. To prevent any axial displacement, the road engaging elements 5 and 9 are connected to each other by the links 18.

It will thus be seen that I have provided an anti-skid device which is simple and efficient in construction and which will afford a great amount of safety for the vehicle. The main weight of the vehicle will be transmitted to the road engaging elements 5 which will tractively engage the roadway while the function of the road engaging elements 9 is to prevent the vehicle from skiding sideways. As noted in Fig. 1 the main road engaging elements are placed along the central axis of the tire while the intermediate road engaging elements are placed on either side thereof.

Claim:

In an anti-skid device of the class described including side chains and main traction members adapted to be placed at intervals at the central axis of the tread of the tire, a set of tension springs in said side chains opposite one of said traction members for resiliently holding the structure to a tire, means for fastening the said cross chains which are opposite to the tension springs to said springs, said means consisting of a pin which fits in the interior of the coils of each of said springs, and a neck formed in said bolt to attach the end of said cross chains thereto.

In testimony whereof I affix my signature.

JOSEPH SCHRAMM.